United States Patent
Chandler et al.

[19]

[11] Patent Number: 5,833,110
[45] Date of Patent: Nov. 10, 1998

[54] ELECTRICAL OUTLET BOX WITH INTEGRAL SUPPORT LEG

[75] Inventors: Craig Chandler, Huntington Beach; James Rice, Garden Grove, both of Calif.

[73] Assignee: Thomas & Betts Corporation, Memphis, Tenn.

[21] Appl. No.: 703,600

[22] Filed: Aug. 23, 1996

[51] Int. Cl.⁶ ................................................. H02G 3/00
[52] U.S. Cl. ............................................ 220/3.9; 220/3.3
[58] Field of Search ........................... 220/3.3, 3.4, 3.5, 220/3.6, 3.7, 3.9, 3.92

[56] References Cited

U.S. PATENT DOCUMENTS

| | | | |
|---|---|---|---|
| 1,509,288 | 9/1924 | Fralick | 220/3.9 |
| 1,718,878 | 6/1929 | Raquette | 220/3.4 |
| 1,961,728 | 6/1934 | Arnest et al. | 220/3.92 |
| 2,143,278 | 1/1939 | Myers | 220/3.92 |
| 2,620,080 | 12/1952 | Tomlin | 220/3.4 |
| 5,359,152 | 10/1994 | Hone-Lin | 220/3.4 X |

*Primary Examiner*—Steven M. Pollard
*Attorney, Agent, or Firm*—Michael L. Hoelter; Salvatore J. Abbruzzese

[57] ABSTRACT

An electrical outlet box which is mounted to a wall stud and having a support leg to prevent deflection of the box by abutment against a wall board attached to the stud. The electrical outlet box includes a back wall which is perimeterically bounded by an outer wall extending outwardly therefrom. The box includes a box interior for accommodating an electrical receptacle or similar component. The support leg is frangibly connected to the outlet box. The outlet box includes a slot adapted to receive the support leg upon frangible removal of the support leg from the outlet box. The support leg once installed in the slot provides a brace which prevents rotational movement of the outlet box.

21 Claims, 6 Drawing Sheets

ELECTRICAL OUTLET BOX WITH INTEGRAL SUPPORT LEG

FIELD OF THE INVENTION

The present invention relates generally to an electrical outlet box. More particularly, the present invention relates to an electrical outlet box having an integrally formed support leg for bracing the outlet box.

BACKGROUND OF THE INVENTION

An electrical outlet box provides an enclosure for an electrical receptacle as well as a termination point for wires carrying electrical current through buildings, houses and other structures. Wiring entering an outlet box is typically connected to a particular electrical fixture or receptacle such as a plug outlet or switch. The box is then typically covered by a face plate having an opening therein to allow access to the outlet or switch while preventing electrified components from being exposed. Outlet boxes may be employed in concealed-wiring installations in which they are located within a wall or ceiling. In such applications outlet boxes are typically secured to structural members such as wall studs or ceiling joists in order to provide support to the box. The support member must be able to withstand forces imparted onto the box and prevent movement of the box under situations such as the repeated insertion and removal of a plug. Alternatively, outlet boxes may be used in exposed-conduit wiring installations where they are exteriorly mounted to a wall, column or ceiling.

In conventional construction, outlet boxes mounted within a wall are typically secured to studs. The studs are then covered by wall boards, such as gypsum board drywall material, which forms the planar wall surface. In many applications, including interior walls, both sides of the studs are covered by wall board. The studs can be made of various materials including wood or steel. Wooden studs are traditionally used in residential construction and steel studs are commonly used in the construction of commercial buildings. However, the use of steel studs is becoming an increasingly popular choice in all types of construction due to their relatively inexpensive price, light-weight construction and ease of installation. Steel studs are typically thin walled U-shaped members, and they are readily available in various sizes including a size similar to the standard nominally dimensional 2"×4" wooden stud.

Use of U-shaped steel studs, however, presents various problems when outlet boxes are attached thereto. While steel studs provide adequate strength in the vertical direction, they are easily rotatable or twistable in the horizontal plane. Therefore, when a load in imparted on an outlet box along the horizontal plane, the box tends to move in the direction of the force due to the deflection of the stud. Such deflection has various undesirable effects including the damaging of the outlet box face plate which covers the outlet box and the loosening of the electrical wiring connected to the receptacle. It is important to prevent outlet box movement since a damaged face plate could leave electrified components exposed and a loosened wire could cause arcing or a short.

Various attempts to address the problems associated with outlet box deflection have been made in the prior art. Prior art designs typically include brackets that are attachable to the outlet box and are engageable with the wall boards secured to either side of the stud. The brackets abut against the wall board upon application of horizontal load to the outlet box so as to prevent twisting or rotation of the box. The brackets are usually separate components that are connected to the outlet box by standard fastening hardware such as screws. This solution, however, requires the production of an additional component thereby increasing the cost of the installed product. Moreover, when a bracket is formed as a separate component, it presents the opportunity for it to be misplaced prior to installation. Additionally, the need to attach the bracket with tools increases the time and cost of installation.

Further, various prior art brackets typically require some sort of adjustment in order to properly space the box between the two layers of wall board. Adjustment required by an installer at the time of installation complicates the job and increases the time and cost of installation.

Prior art devices addressing the outlet box deflection problem are disclosed in U.S. Pat. No. 4,399,922 to Horsley and U.S. Pat. No. 4,844,275 to Schnell et al.

Horsley discloses an L-shaped outlet box mounting bracket. One leg of the bracket extends parallel to the face of the outlet box and is securable to the box and to a wall stud. The other leg forms an extension and projects orthogonally rearwardly toward a rear wall board which is connected to the stud behind the box. The extension bears against the rear wall board in order to brace the box against loads tending to move the box rearwardly. A set of weakening lines are formed on the extension which facilitates bending the end of the extension so that its length may be adjusted to properly fit the application. The Horsley device has some undesirable attributes, one being that it requires the use of a separate substantially sized component to accomplish the bracing function. Having an extra component adds to the cost of manufacturing and increases the time and costs of installation. In addition, the length of the extension must be adjusted in order to achieve a proper fit in a given application which adds to the labor required for installation.

Schnell et al. discloses a non-metallic outlet box having a pair of attachment ears for securing the box to a metallic wall stud. The box includes a pair of support brackets integrally formed with the box, and they extend from the rear edge of both box side walls. The box and extensions are dimensioned so that the brackets will abut a rear wall panel when the box is secured to the stud. The brackets are permanently positioned extending from the back wall. This presents a problem with shipping and subsequent handling of the boxes. The brackets effectively increase the overall length of the box resulting in a relatively bulky product which is expensive to package. The large boxes are also awkward for and installer to carry especially if there is a number of them. In addition, since the brackets extend from the box they are subject to breakage if mishandled. In order to avoid this type of damage, permanently extending brackets are typically designed with ribs or supports. This results in a bracket which is over designed for its required application, which leads to increases in manufacturing costs.

Accordingly, it is desirable to provide an electrical outlet box having a support bracket that is integrally formed with the box, and of the proper dimension to provide support to the outlet box in standard applications and that is compact and economical to produce.

SUMMARY OF THE INVENTION

It is an object of the present invention to provide an electrical outlet box assembly having an integrally formed support leg.

It is a further object of the present invention to provide an electrical outlet box assembly having a support leg which is frangibly attachable to the outlet box and movable to an installed position, enabling the support leg to restrict movement of the box.

It is still a further object of the present invention to provide an electrical outlet box assembly including an outlet box having a base wall parametrically bounded by an outer wall extending upwardly therefrom to define an outlet box interior. A support leg is frangibly connected to the outlet box in an uninstalled position. The outlet box further includes an aperture adapted to receive the support leg, such that upon removal of the support leg from the uninstalled position, the support leg is insertable into the aperture thereby providing a brace for the outlet box.

In the efficient attainment of these and other objects, the present invention provides an electrical outlet box assembly. The assembly includes an outlet box having a base wall parametrically bounded by an outer wall extending upwardly therefrom to define a box interior for accommodating an electrical receptacle. The outer wall further defines a receptacle opening. The outlet box includes a mounting flange for securing the box to a wall stud. The assembly further includes a support leg frangibly connected to the box outer wall in an uninstalled position and being removable therefrom. Box outer wall includes a slot that is adapted to receive the support leg in an installed position such that when the leg is in the installed position, the leg is engageable with a rear wall board to prevent rearward movement of the outlet box.

As more specifically described by way of the preferred embodiment herein, the support leg in the uninstalled position is integrally formed with the outlet box. The frangible connection between the box and the leg is formed by a bridge having a reduced cross-sectional area. The bridge is fracturable adjacent the reduced cross-sectional area upon deflection of the leg, thereby causing the leg to be released from the box. The box outer wall includes a first and second opposed side walls and a top and bottom wall; the walls form a substantially rectangular outlet box. The leg receiving slot is formed on the first side wall and the mounting flange is formed on the second side wall. The outlet box further includes at least one tab extending from the first side wall, that is abutable with a front wall board for bracing the box and restricting forward movement thereof.

DETAILED DESCRIPTION OF THE PREFERRED EMBODIMENT

Figure 1:
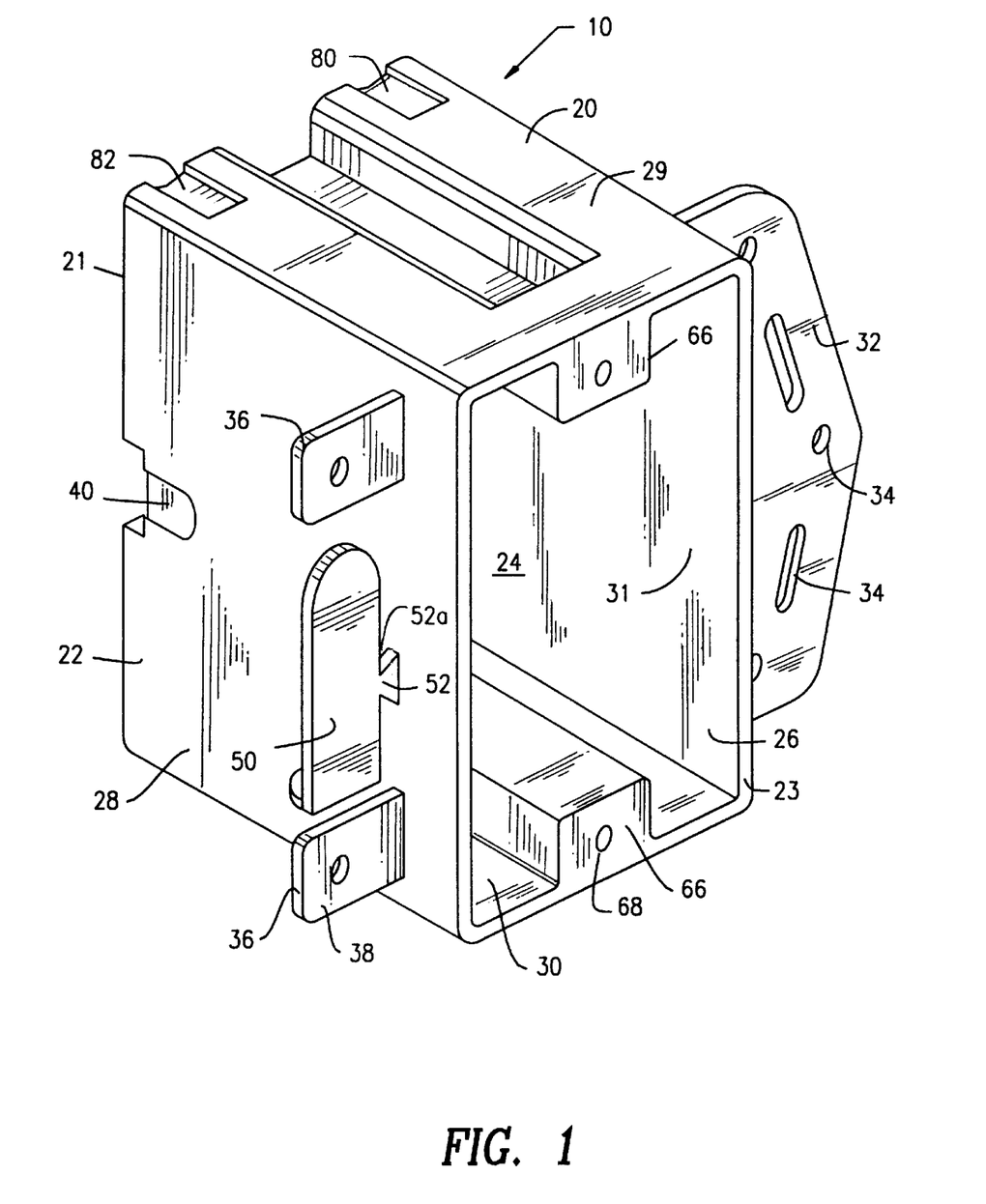
FIG. 1 is a perspective view of the electrical outlet box assembly of the present invention including a support leg shown in an uninstalled position.

Referring to FIG. 1, the electrical outlet box assembly 10 of the present invention is shown in its preferred embodiment. The assembly includes an electrical outlet box 20 and a support leg 50 which is shown in its initial uninstalled position. The term outlet box, used herein throughout, is intended to include such devices as electrical switch boxes, junction boxes and the like.

Outlet box 20 includes a back wall 21 perimeterically bounded by an outer wall 22 forming a box interior 24. Outer wall 22 extends outwardly from back wall 21 and terminates in a rim 23 that defines a receptacle opening 31. Receptacle opening 31 and box interior 24 are sized to accommodate a variety of electrical receptacles such as outlets and switches (not shown). Assembly 10 is preferably formed of a molded polymer, such as polyvinyl chloride PVC), with all the elements of the assembly being integrally molded.

Outer wall 22 is formed by a pair of opposed side walls 26,28 and a top and bottom wall 29,30 respectively. Walls 26,28,29,30 form a substantially rectangular single-gang outlet box. It is also within the contemplation of the present invention that outlet box 20 may be formed in a variety of shapes, such as octagonal, square or round, and may be double or triple-gang as is well known in the art. Outlet box 20 may also include a plurality of wire openings 80 formed in the walls to provide a passage way for wiring to enter the box. Wire openings 80 may be covered by knockouts 82 which are frangibly connected to box 20 and may be removed as required by the installation.

Figure 6:
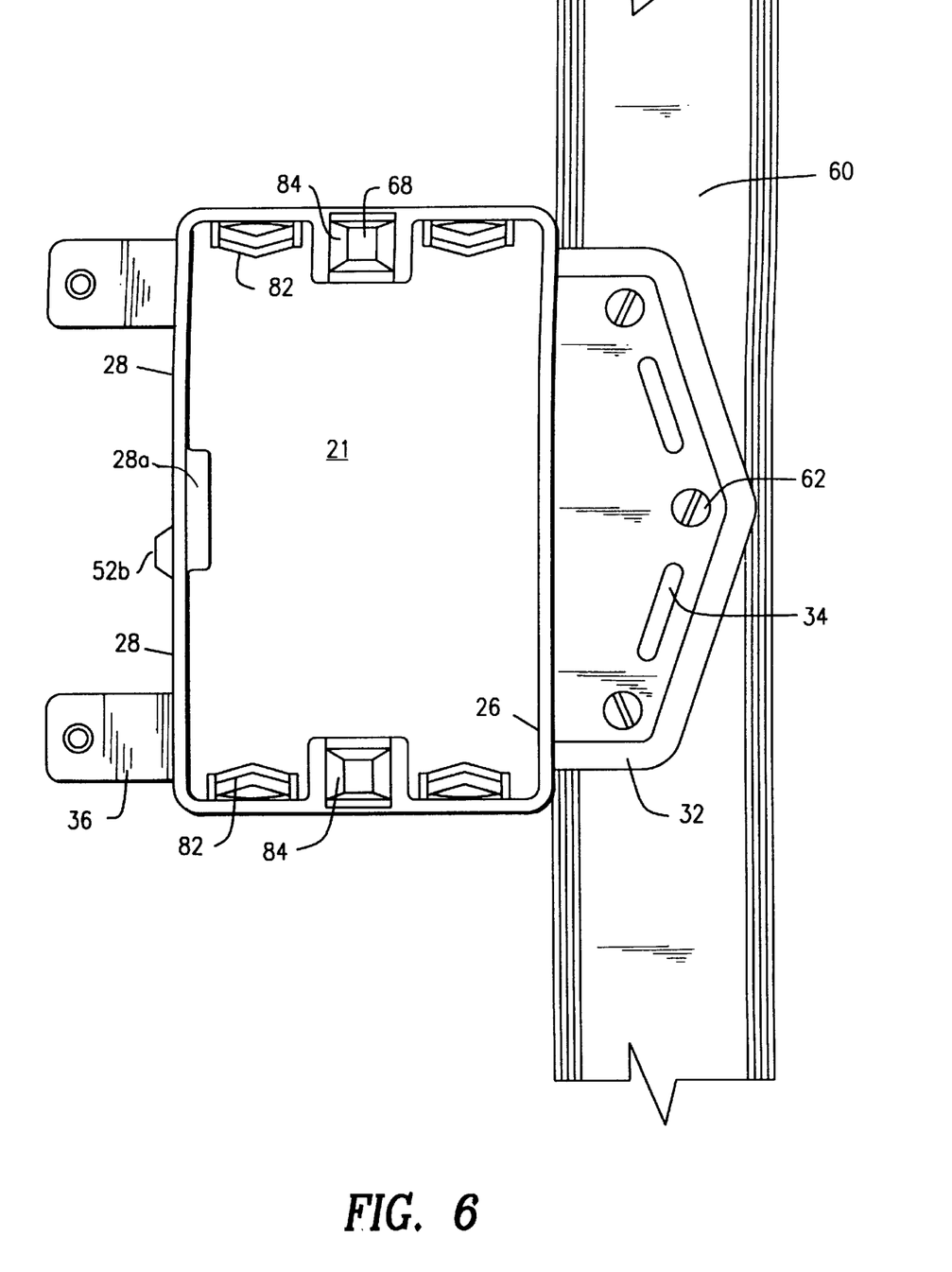
FIG. 6 is a front elevational view of the outlet box assembly of the present invention mounted to a wall stud.

Outlet box 20 further includes a pair of receptacle mounting projections 66 for securing a receptacle (not shown) to the box. Projections 66 extend inwardly toward box interior 24 from top and bottom walls 29,30 and include apertures 68 adapted for securing receptacle mounting hardware (not shown). The spacing between the apertures 68 is selected to accommodate a standard electrical receptacle. As shown in FIG. 6, apertures 68 may be formed by metallic inserts 84 that are clipped into the front face of projections 66. Metallic inserts 84 provide an area of increased strength which is capable of supporting the receptacle mounting screws. Alternatively, the apertures may include integrally molded threads in order to receive the mounting screws.

Conventional wall construction includes the use of vertical studs extending from floor to ceiling. The studs may be formed of either wood or metal such as steel. Wooden studs are typically employed in residential construction while metallic studs are typically used in commercial construction. Steel studs are conventionally formed from a thin sheet of steel that is stamped or rolled into generally a U-shaped member. Once the studs have been installed, they are covered by wall board such as a gypsum board drywall material. In many applications, such as interior walls, both sides of the studs are covered by wall board. In-wall mounted outlet boxes are typically secured to the studs prior to the installation of the wall board panel which would cover the box.

Figure 5:
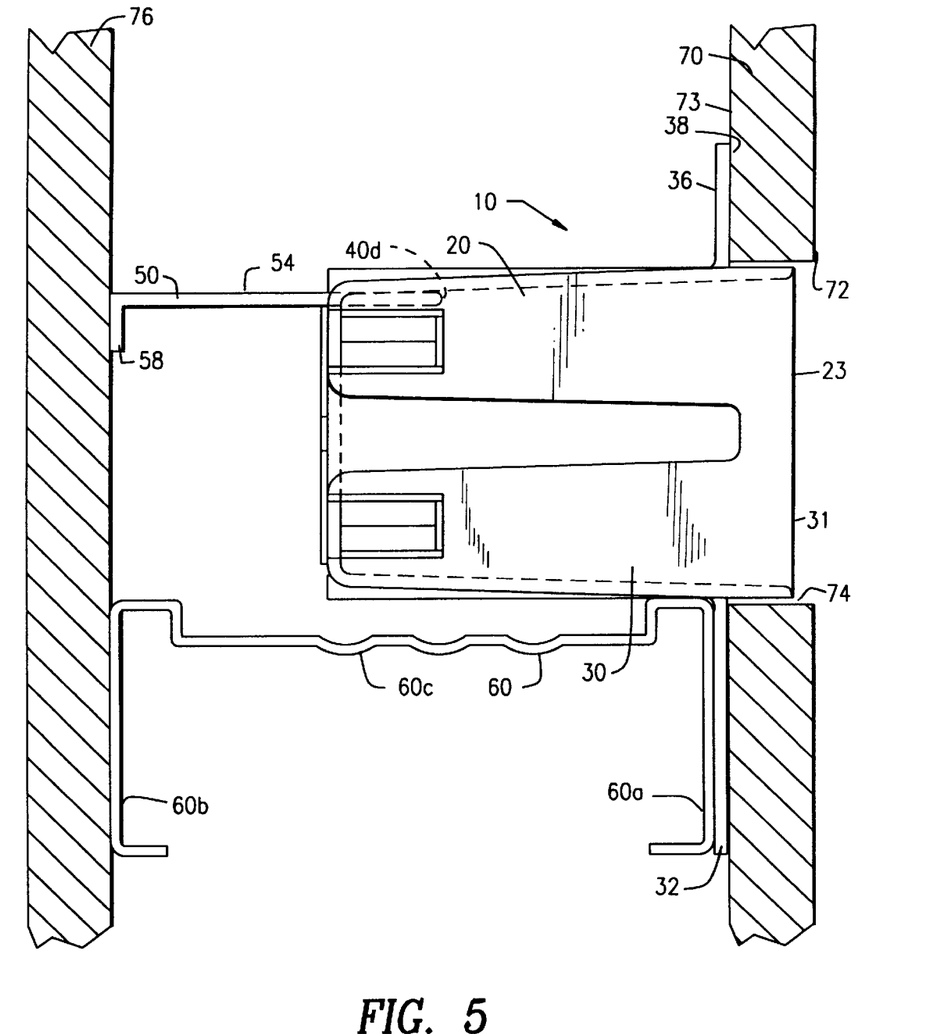
FIG. 5 is a bottom side elevational view of the outlet box assembly of the present invention mounted in between two wall boards shown in section.

As shown in FIG. 5, outlet box assembly 10 is adapted for in-wall mounting in typical wall construction as described above. FIG. 5 illustrates a thin-walled, U-shaped steel stud 60 of the type typically employed. Stud 60 includes a front face 60a and a rear face 60b extending outwardly from a side face 60c. The stud is covered by front and rear wall boards 70,76, respectively, such as drywall, which forms the planar wall surface. Front wall board 70 is attached to the front face 60a of stud 60 adjacent receptacle 31 opening of the box and rear wall board 76 is attached to the rear face 60b of stud 60.

As shown in FIGS. 1, 5 and 6, outlet box 20 is securable to stud 60 by way of a mounting flange 32 extending generally orthogonally from side wall 26. Mounting flange 32 is a substantially planar member that is abutable against the front face 60a of wall stud 60 for attachment thereto. Flange 32 includes a plurality of apertures 34 extending therethrough in order to permit the passage of mounting hardware such as screws 62. The apertures may be both round and slotted. Wall board 70 is secured to stud 60 adjacent the receptacle opening 31. Therefore, wall board 70 includes an opening 74 placed therein which is concentric with receptacle opening 31 in order to permit access to box interior 24 for installing a receptacle. Mounting flange 32 is a relatively thin member so that only a nominal deformation of the wall board occurs when the board is mounted to the stud over flange 32. However, the thickness is sufficient to provide adequate strength to support the box. The strength of the connection between flange 32 and side wall 26 could be increased by the use of gussets or ribs (not shown ) in a manner well known in the art. While outlet box 20 is shown attached to a steel stud, outlet box 20 may also be secured to a conventional wooden stud by flange 32 with the use of screws, nails or staples.

Mounting flange 32 is preferably located at a point along the length of side wall 26 such that when wall board 70 is installed, rim 23 sits slightly below or flush to the front face 72 of wall board 70. This permits proper installation of a face plate (not shown) which covers the box and the receptacle (not shown) housed therein.

Mounting an outlet box to a metallic stud present various problems. Steel U-shaped studs provide adequate support in the vertical plane, however, they are susceptible to rotation or twisting about the horizontal plane. Outlet boxes are subjected to various forces acting in the horizontal plane resulting from such activity as the insertion and removal of a plug from an outlet receptacle or pushing on a wall switch. An outlet box mounted to a stud by a side wall extending flange creates a moment arm for a force imparted on the box resulting in a torque capable of deflecting the stud. Therefore, when forces are exerted on an outlet box secured to a steel stud, the box deflects in the direction of the force. The resulting box movement can damage the face plate as well as loosen the wires attached to the receptacle. In contrast, wooden studs, due to the inherent structure of the wood, provide adequate resistance to rotation.

Figure 4A:
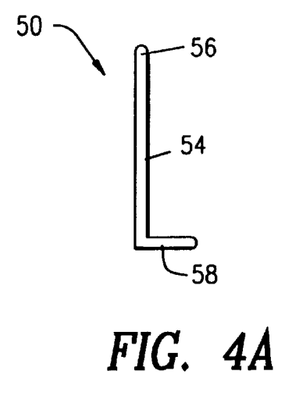
FIG. 4A is a side elevational view of the support leg of the present invention.
Figure 4B:
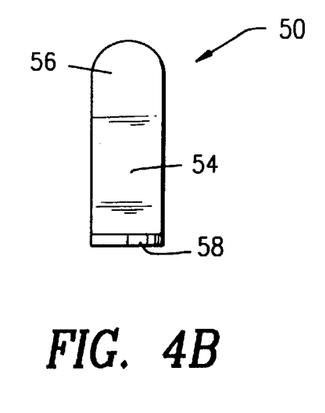
FIG. 4B is a front elevational view of the support leg of the present invention.
Figure 4C:
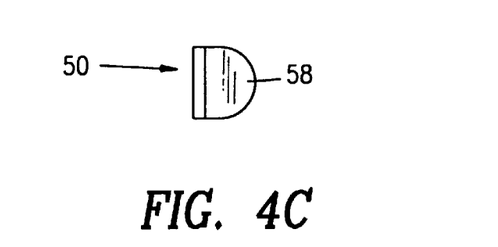
FIG. 4C is a top plan view of the support leg of the present invention.

In order to address the problems associated with metallic studs, the present invention further includes a support leg 50. Support leg 50 is positionable on box 20 such that it provides resistance to rotation about the metallic stud, as will be described below. As shown in FIGS. 4A, 4B and 4C, support leg 50 is preferably an L-shaped member having an elongate portion 54 with a top portion 56 formed at one end and a foot portion 58 formed at the other end. Top portion 56 is preferably rounded to facilitate insertion in slot 40 as will be described below. Foot portion 58 extends orthogonally from elongate portion 54 and forms a bearing surface for engaging a wall surface to resist movement. Support leg 50 may also be used with wooden studs in order to provide an added degree of support. However, due to the inherent strength of wood studs, leg 50 is typically not required.

Referring to FIG. 1, both leg 50 and box 20 are preferably molded as one piece forming assembly 10, in order to maximize efficiency and economy in production. Support leg 50 in its initial uninstalled position is connected to side wall 28 by a frangible bridge 52. Bridge 52 is preferably a thin strip of material having a frusto-triangular shape and a reduced cross-sectional portion 52a adjacent leg 50. The shape and thickness of bridge 52 facilitates manual removal of leg 50 from box 20 by an installer without the use of tools. In order to remove leg 50, an installer need only to manually grip and deflect leg 50 which will result in bridge 52 fracturing about reduced portion 52a.

FIG. 1 illustrates assembly 10 as it would be supplied to the installer. Since leg 50 is physically connected to box 20 the chances that leg 50 would become separated from box 20 during shipping and subsequent handling is greatly reduced.

Figure 2:
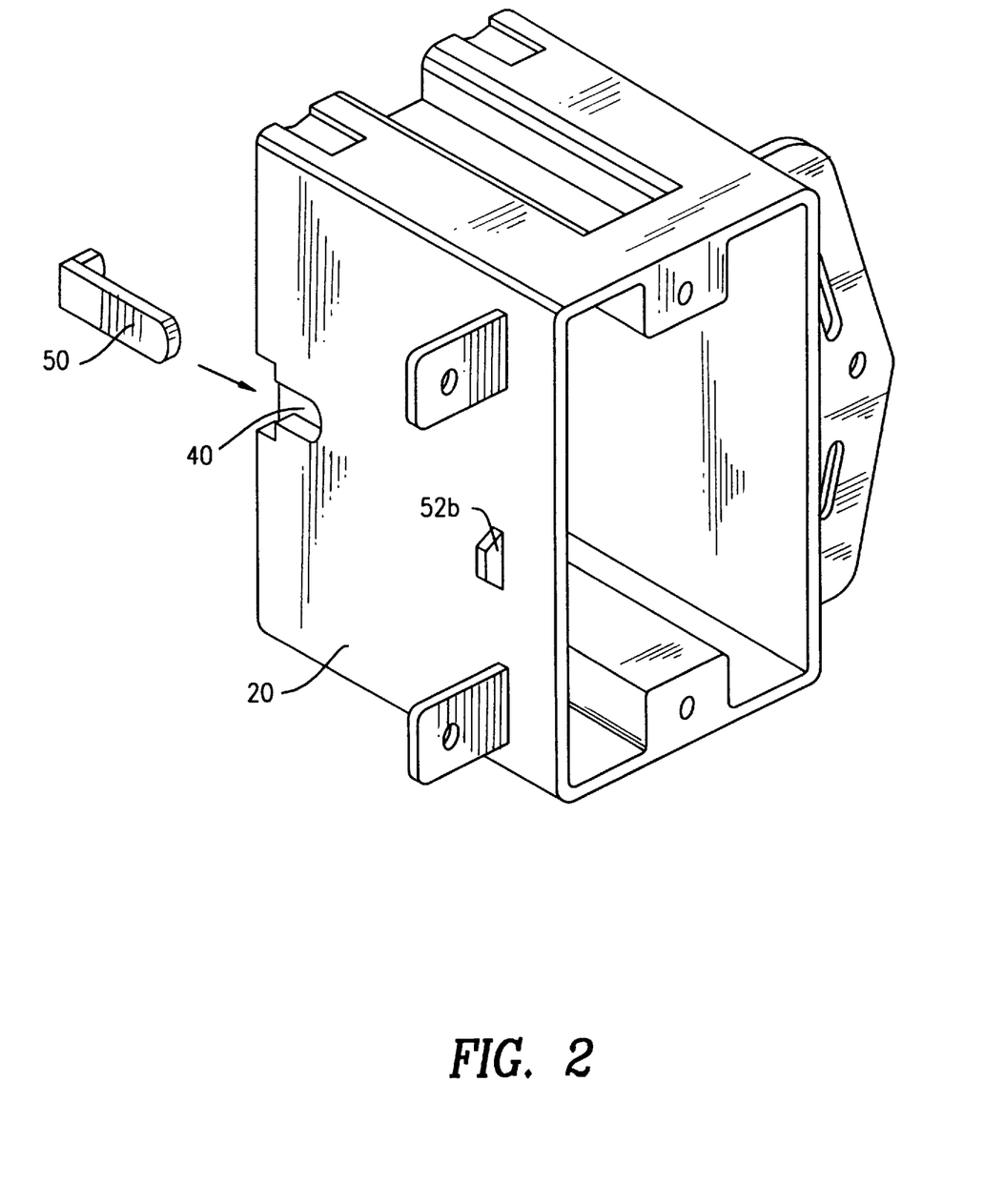
FIG. 2 is a perspective view of the electrical outlet box assembly of the present invention with the support leg shown prior to insertion into a slot.
Figure 3:
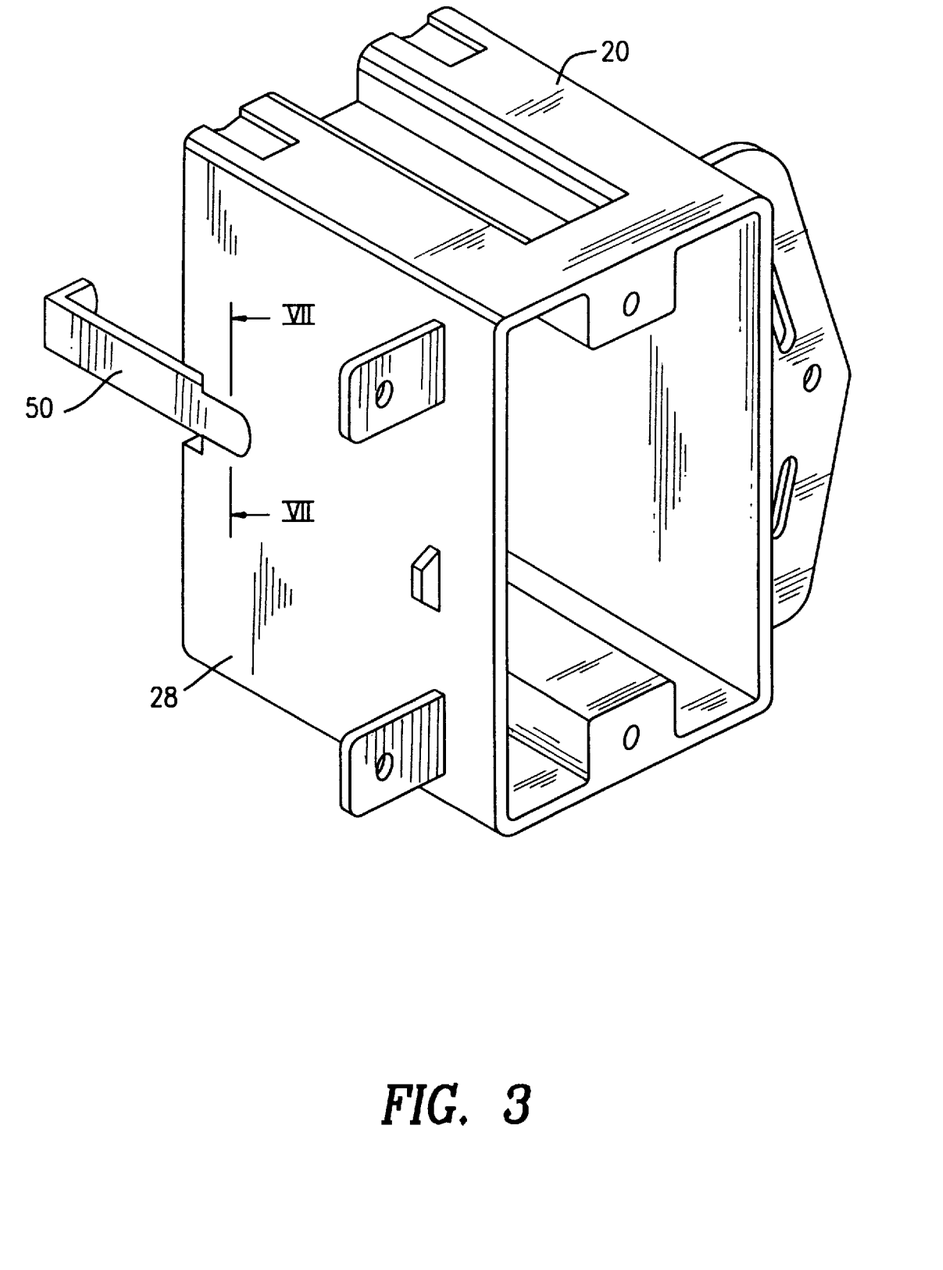
FIG. 3 is a perspective view of the electrical outlet box assembly of the present invention with the support leg shown in the installed position, inserted into the slot.

In order to install leg 50 in box 20 so that it may perform a bracing function, support leg 50 is first removed from side wall 28 by twisting and deflecting leg until bridge 52 breaks as described above. After leg 50 is separated from box 20, as shown in FIG. 2, leg 50 can then be moved into its installed position, as shown in FIG. 3. Installation of leg 50 is achieved by urging the rounded top end 56 of leg 50 into slot 40 until it engages the top 40d of slot 40 as shown in FIG. 5. In the installed position, leg 50 extends rearwardly beyond back wall 21. When leg 50 is fully inserted into slot 40 it preferably has such a length that it will engage a rear wall board for the common 2"×4" nominal stud size. Therefore, no adjustment is required by the installer. It is also within the contemplation of the present invention that leg 50 could be dimensioned to any size so that it is compatible with a variety of stud sizes.

Prior to installation of the box, leg 50 is attached to the box side wall and not extending from back wall 21. This permits both assembly 10 to be as compact as possible during shipping and handling by the installer. Furthermore, the support leg need only be designed to perform its intended function of bracing the outlet box and not designed to prevent breakage during shipping.

Referring again to FIG. 5, when box 20 is mounted to stud 60 with leg 50 in the installed position, leg foot portion 58 abuts the rear wall board 76. Therefore, when a rearwardly directional force is exerted upon box 20, box movement is prevented by leg 50 as foot portion 58 bears against rear wall 76. This bracing accomplished by way of leg 50 helps to prevent outlet box deflection and the problems associated therewith.

Figure 7:
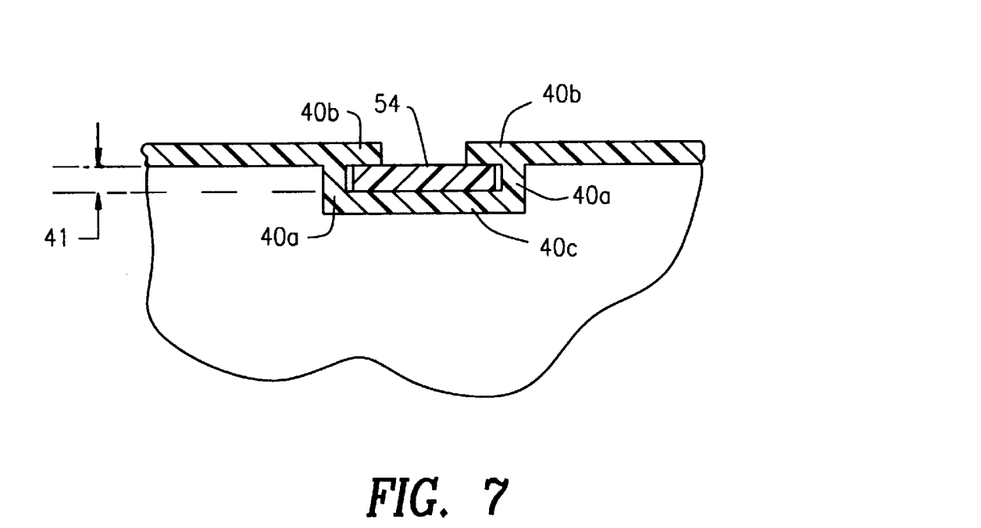
FIG. 7 is a cross-sectional view of the slot taken along line VII—VII of FIG. 3.

Referring back to FIGS. 1 and 6, slot 40 is preferably formed in side wall 28 adjacent back wall 21 and equidistant between top and bottom walls 29,30. Slot 40 is formed by a depression in side wall 28 which results in a bulge 28a in the inside surface of side wall 28. As shown in greater detail in FIG. 7, slot walls 40a are spaced apart slightly larger than the width of leg 50 to allow the leg to be slidable between walls 40a. A portion of the slot is covered by shoulders 40b which extend over slot back wall 40c and toward each other defining a slot space 41. Slot space 41, is sized to receive leg 50. The distance between shoulders 40b and slot back wall 40c preferably has a dimension slightly smaller than the thickness of leg 50 such that a slight interference fit is achieved between the slot and leg. The interference fit helps retain support leg 50 in slot 40 during installation of box 20.

The side wall location of slot 40 opposite mounting flange 32 is optimum since when leg 50 is inserted into the slot maximum resistance to rotation about the stud is provided. More specifically, by locating support leg 50 on the box side of wall opposite mounting flange 32 both sides of the box are supported and the box's ability to resist forces is augmented. Slot 40, however, could be located on either the top or bottom walls in alternative embodiments in order to provide resistance to rotation and deflection of the box. Additionally, it is within the contemplation of the present invention that the slot could be formed in a variety of ways. For example, the slot could be formed by an aperture in back wall 21 in which leg 50 would be insertable (not shown). Leg 50 could further include a projection which would limit its travel within the slot so that the leg would extend the correct length out of the back of the box (not shown).

Forward movement of outlet box 20 is restricted by a pair of tabs 36 extending from side wall 28, as shown in FIGS.

1 and 5. Each tab 36 is adjacently disposed to top and bottom walls 29,30. Tabs 36 are further disposed toward the opening 31 of box 20 but inset from rim 23 such that when front wall board 70 is secured to stud 60 the front surface 38 of tabs 36 abuts the back face 73 of wall board 70. Therefore, when a force is imparted on box 20 tending to move the box forwardly, tabs 36 are urged against wall board 70 and movement is restricted.

Leg 50 and bridge 52 are preferably disposed on side wall 28 in the same plane as or closer to back wall 21 than tabs 36 so that the portion 52b of bridge 52, remaining after leg 50 is removed, as shown in FIG. 2, will not interfere with tabs 36 engagement with front wall board 70. Moreover, positioning bridge 52 behind tabs 36 allows tabs 36 to operate properly when leg 50 is left in the uninstalled position. This may occur in wooden stud application as described above. However, it is within the contemplation of the present invention that leg 50 and bridge 52 may be disposed at a variety of locations on both the inside and outside of the outlet box.

Although the illustrative embodiments of the present invention have been described herein with reference to the accompanied drawings, it is to be understood that the invention is not limited to those precise embodiments, and that various other changes and modifications may be effected therein by one skilled in the art without departing from the scope or spirit of the invention.

We claim:

1. An electrical outlet box assembly comprising:
   an outlet box having a back wall perimeterically bounded by an outer wall extending outwardly therefrom defining a box interior for accommodating an electrical receptacle, said outer wall further defining an receptacle opening;
   a support leg frangibly connected to said outlet box in an uninstalled position; and
   said outlet box having a first aperture adapted to receive said support leg, such that upon removal of said support leg from said uninstalled position said support leg is movable in an installed position wherein said leg is insertable into said aperture thereby providing a brace for said outlet box.

2. An electrical outlet box assembly as defined in claim 1 wherein said support leg in said uninstalled position is integrally formed with said outlet box.

3. An electrical outlet box assembly as defined in claim 2 wherein said frangible connection between said box and said leg is formed by a bridge, said bridge being fracturable upon deflection of said leg thereby releasing said leg.

4. An electrical outlet box assembly as defined in claim 3 wherein said assembly is formed of molded plastic.

5. An electrical outlet box assembly as defined in claim 1 further including a mounting flange extending from said outer wall for securing said outlet box to a wall stud.

6. An electrical outlet box assembly as defined in claim 5 wherein said first aperture is formed on said outer wall opposite said mounting flange.

7. An electrical outlet box assembly as defined in claim 6 wherein an upper portion of said leg is supported in said first aperture and a lower portion of said leg extends rearwardly from said first aperture when said leg is in said installed position, said leg lower portion ending in a bearing surface which is abutable with a wall board secured to said wall stud in order to prevent rearward movement of said outlet box.

8. An electrical outlet box assembly as defined in claim 7 wherein said bearing surface of said leg is a foot portion which extends orthogonally to said direction of said leg extension.

9. An electrical outlet box assembly as defined in claim 1 wherein said outer wall includes a first and second side wall and a top and bottom wall forming a substantially rectangular outlet box.

10. An electrical outlet box assembly as defined in claim 9 further including a mounting flange extending from said first side wall for securing said outlet box to a wall stud.

11. An electrical outlet box assembly as defined in claim 10 wherein said mounting flange includes a plurality of second apertures extending therethrough to accommodate mounting hardware.

12. An electrical outlet box assembly as defined in claim 10 wherein said first aperture is formed on said second side wall of said outlet box.

13. An electrical outlet box assembly as defined in claim 12 further including at least one tab extending from said second side wall, said at least one tab providing means for restricting forward movement of said box.

14. An electrical outlet box assembly as defined in claim 13 wherein said second side wall includes two tabs.

15. An electrical outlet box assembly mountable to a wall stud positioned between a front and rear wall board comprising:
   an outlet box having a back wall perimeterically bounded by an outer wall extending outwardly therefrom and defining a box interior for accommodating an electrical receptacle, said outer wall further defining an receptacle opening;
   a mounting means for securing said box to said stud;
   a support leg frangibly connected to said box in an uninstalled position, said leg being removable from said uninstalled position; and
   a slot formed on said box and adapted to receive said support leg in an installed position, such that when said leg is in said installed position, said leg is engageable with said rear wall to prevent rearward movement of said box.

16. An electrical outlet box assembly as defined in claim 15 wherein said support leg in said uninstalled position is integrally formed with said outlet box.

17. An electrical outlet box assembly as defined in claim 16 wherein said frangible connection between said box and said leg is formed by a bridge having a reduced cross-sectional area, said bridge being fracturable adjacent said reduced cross-sectional area upon deflection of said leg thereby releasing said leg.

18. An electrical outlet box assembly as defined in claim 15 wherein said support leg includes an elongate member having a first and second end, said first end having a foot portion extending orthogonally from said member to provide a bearing surface for engagement with said rear wall, said second end being rounded to facilitate reception of said leg into said slot.

19. An electrical outlet box assembly as defined in claim 15 wherein said outer wall includes a first and second opposed side walls and a top and bottom walls forming a substantially rectangular outlet box, said slot being formed on said first side wall and said mounting flange being formed on said second side wall.

20. An electrical outlet box assembly as defined in claim 19 wherein said slot is defined by a back wall having a pair of spaced side wall extending therefrom said slot side walls each having a portion extending over said back wall forming a slot space, said slot space being sized slightly smaller than said leg to form an interference fit between said slot and said leg.

21. An outlet box as defined in claim 19 further including at least one tab extending from said first side wall, said at least one tab being abatable with said front wall board for bracing said box and restricting forward movement thereof.

* * * * *